United States Patent [19]

Imazeki

[11] Patent Number: 5,661,392
[45] Date of Patent: Aug. 26, 1997

[54] DEVICE FOR CAUSING ELECTRONIC APPARATUS TO USE A SELECTIVELY MOUNTED NON-RECHARGEABLE BATTERY PACK OR RECHARGEABLE BATTERY PACK

[75] Inventor: Kazuyoshi Imazeki, Tokyo, Japan

[73] Assignee: General Research of Electronics, Inc., Tokyo, Japan

[21] Appl. No.: 533,846

[22] Filed: Sep. 26, 1995

[51] Int. Cl.$^6$ ............................... H02J 7/00; H01M 2/10
[52] U.S. Cl. .................................... 320/2; 429/96
[58] Field of Search ..................... 320/2, 3; 429/96, 429/97, 98, 99, 10

[56] References Cited

U.S. PATENT DOCUMENTS

| | | | |
|---|---|---|---|
| 3,763,434 | 10/1973 | Blesch et al. | 455/349 |
| 4,140,957 | 2/1979 | Rapp | 320/2 |

*Primary Examiner*—Peter S. Wong
*Assistant Examiner*—Patrick B. Law
*Attorney, Agent, or Firm*—Trexler, Bushnell, Giangiorgi & Blackstone, Ltd.

[57] ABSTRACT

A device, which is adapted to be connected to an electronic apparatus, is capable of having a non-rechargeable battery pack or a rechargeable battery pack connected thereto. The battery packs supply a driving voltage to the electronic apparatus when connected to the device. The device can have an external power source attached thereto for energizing the electronic apparatus by a DC voltage, for disabling the driving voltage supplied by the battery packs and for supplying a charging voltage to the device and to the rechargeable battery pack. The device automatically discriminates between the rechargeable battery pack and the non-rechargeable battery pack so that the charging voltage from the external power source is only applied to the rechargeable battery pack and not to the non-rechargeable battery pack.

The rechargeable battery pack includes a casing having a positive electrode and a negative electrode mounted thereon and a non-conductive insulating member which is connected to the casing. The insulating member extends outwardly from the casing a predetermined distance such that when the rechargeable battery pack is placed on a surface, the insulating member contacts the surface and prevents the electrodes from contacting the surface. A gap is provided between the electrodes on the rechargeable battery pack in which the non-conductive insulating member is provided.

4 Claims, 3 Drawing Sheets

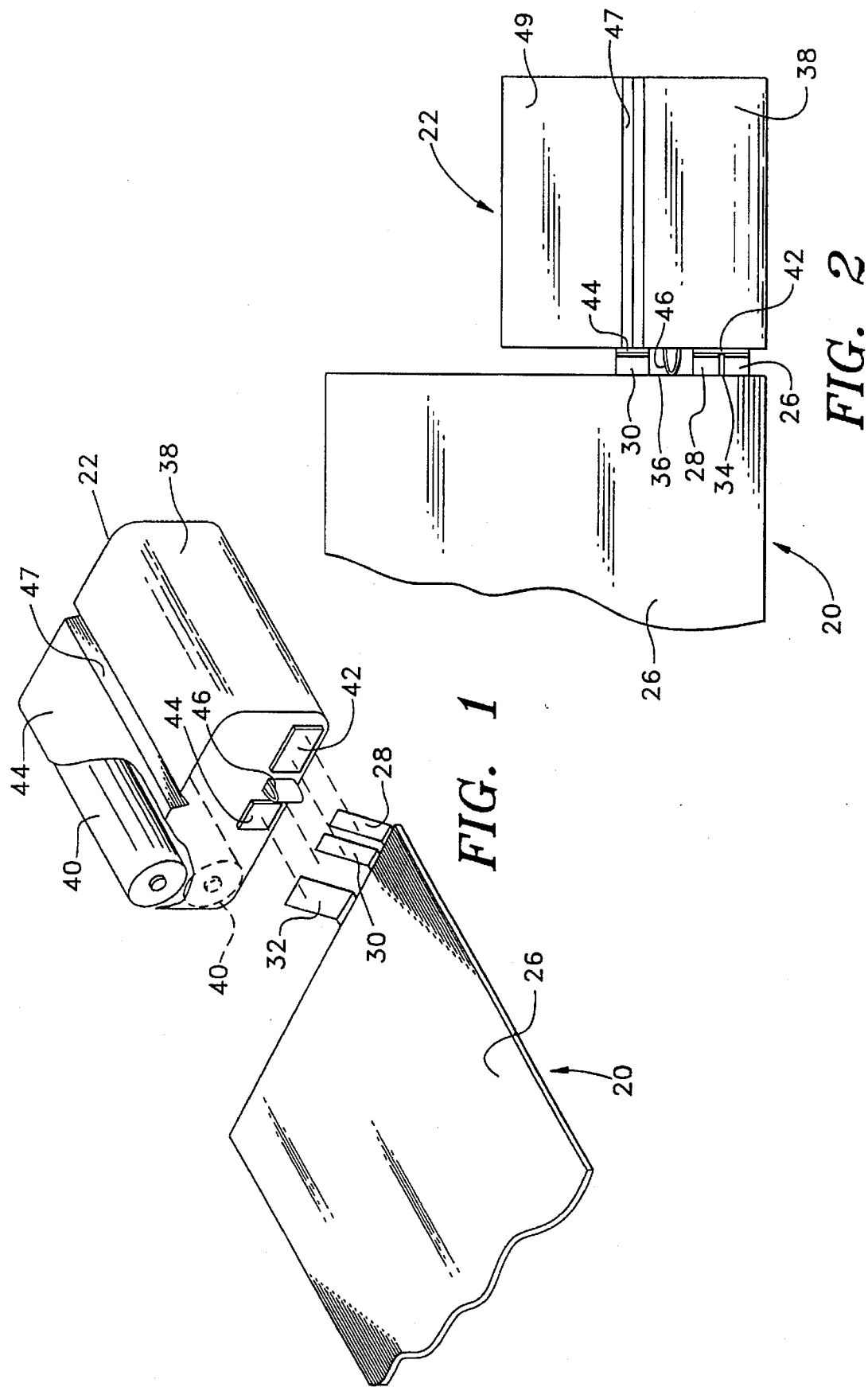

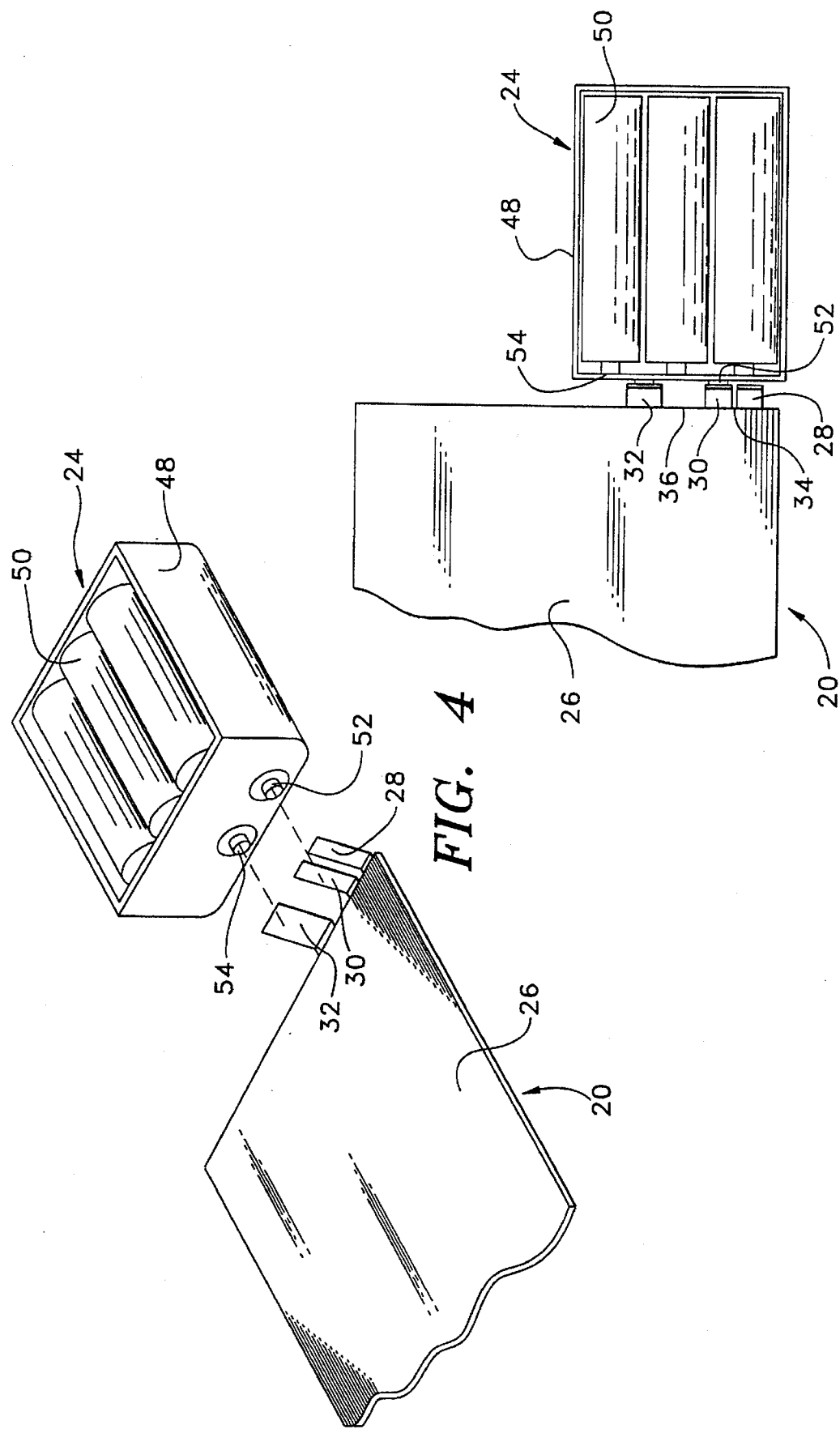

5,661,392

DEVICE FOR CAUSING ELECTRONIC APPARATUS TO USE A SELECTIVELY MOUNTED NON-RECHARGEABLE BATTERY PACK OR RECHARGEABLE BATTERY PACK

BACKGROUND OF THE INVENTION

When mounting either a non-rechargeable Alkaline battery pack or a rechargeable Ni-Cd battery pack, an electronic apparatus, such as a portable scanner, portable telephone, lap top computer, and the like, provides for an extra switch or other manual selection means to prevent an external charging voltage from being applied to the non-rechargeable battery pack because of the danger, such as explosion, that may occur if the external charging voltage is applied to the non-rechargeable battery pack. Operation of this extra switch or other means causes problems because an operator might not recognize in advance which type of battery pack is to be mounted, chargeable or non-rechargeable.

Accordingly, an object of the present invention is to provide structure for causing an electronic apparatus to discriminate automatically between two types of battery packs, a non-rechargeable battery pack and a chargeable battery pack, which are to be mounted to the electronic apparatus. Because the electronic apparatus automatically determines the type of battery pack mounted to the electronic apparatus, an operator does not need to pay special attention to the operation of the extra switch or other manual selection means provided in the prior art.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a rechargeable battery pack holding a plurality of rechargeable batteries therein and having a pair of electrodes thereon and an electronic apparatus having a plurality of contacts, such pack and apparatus incorporating features of the present invention;

FIG. 2 is a top view of the rechargeable battery pack shown in FIG. 1 in contact with the electronic apparatus showing how the electrodes of the rechargeable battery pack engage the contacts of the electronic apparatus;

FIG. 4 is a perspective view of the electronic apparatus shown in FIGS. 1–3 and a perspective view of a non-rechargeable battery pack holding a plurality of non-rechargeable batteries therein and having a pair of electrodes thereon; and FIG. 5 is a top view of the non-rechargeable battery pack shown in FIG. 4 in contact with the electronic apparatus showing how the electrodes of the non-rechargeable battery pack engage the contacts of the electronic apparatus.

DETAILED DESCRIPTION OF THE INVENTION

Figure 3:
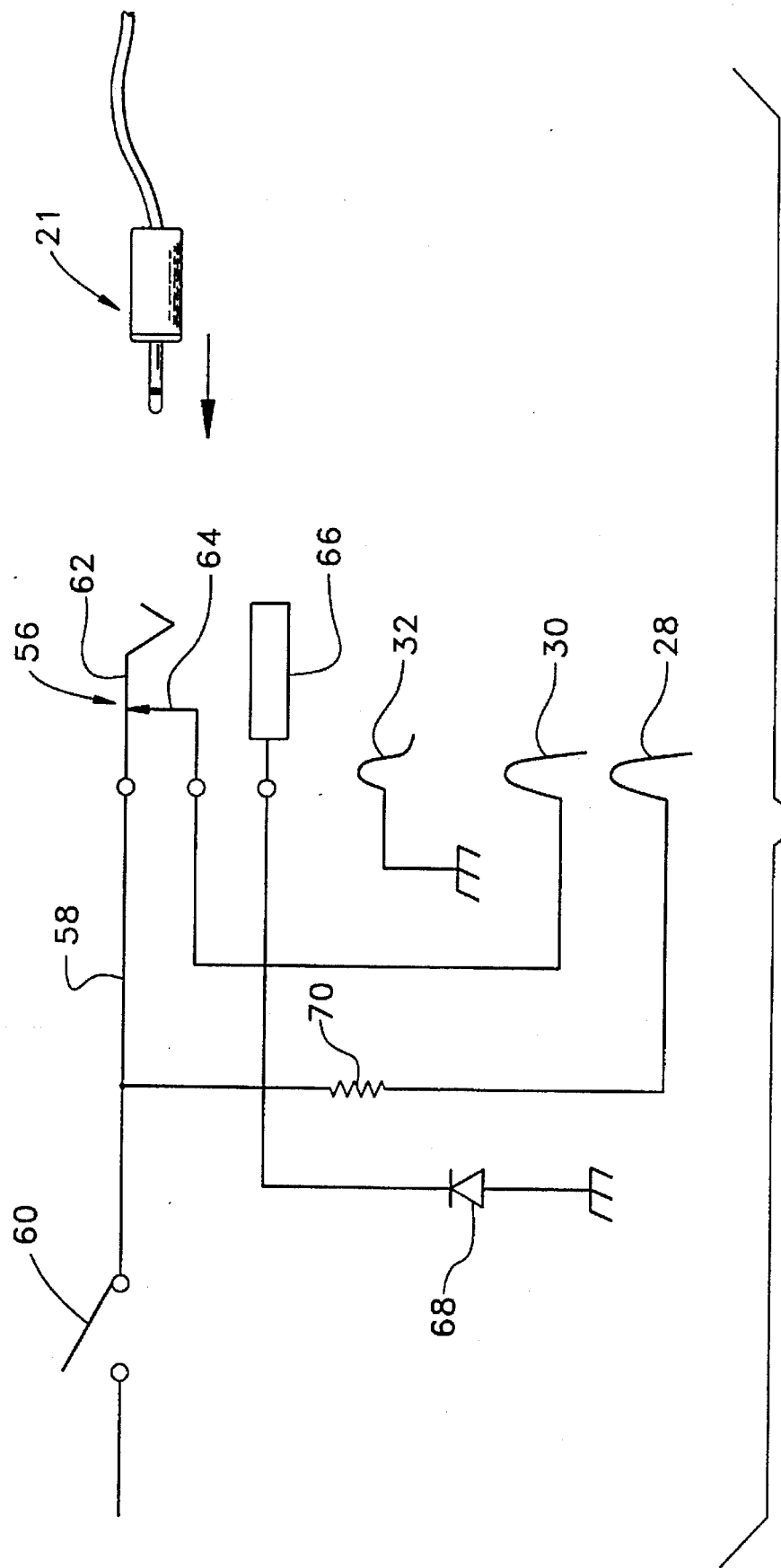
FIG. 3 is an electrical diagram of the contact configuration of the electronic apparatus.

While the invention may be susceptible to embodiment in different forms, there is shown in the accompanying drawings, and herein described in detail, a specific embodiment with the understanding that the present disclosure is to be considered an exemplification of the principles of the invention, and is not intended to limit the invention to this specific embodiment illustrated and described herein.

In accordance with the present invention, an electronic apparatus 20 can use a rechargeable battery pack 22 or a non-chargeable battery pack 24 without needing to recognize the type of the battery pack. The electronic apparatus 20 automatically determines what type of battery pack is mounted therewith so that an external charging voltage, which is supplied by a conventional DC plug 21 (shown in FIG. 3), is applied to the electronic apparatus 20 and the rechargeable battery pack 22, but is not applied to the non-rechargeable battery pack 24. This prevents possible problems, such as an explosion, which could occur if the external charging voltage is applied to the non-rechargeable battery pack 24. FIGS. 1 and 2 show the electronic apparatus 20 being used with the novel rechargeable battery pack 22 in accordance with the present invention. FIGS. 4 and 5 show the electronic apparatus 20 being used with the non-rechargeable battery pack 24.

The electronic apparatus 20 includes a plastic housing (not shown) which houses a printed circuit board 26 therein. The printed circuit board 26 has a plurality of contacts 28, 30, 32 thereon and which extend outwardly therefrom. Specifically, the electronic apparatus 20 includes a first contact 28, a second contact 30 and a third contact 30. A gap 34 is provided between the first and second contacts 28, 30 and another gap 36 is provided between the second and third contacts 30, 32. The gap 36 is much wider than the gap 34 for reasons described herein. The contacts 28, 30, 32 are preferably made as spring members and arranged on the end of the printing circuit board 26.

The rechargeable battery pack 22, as shown in FIGS. 1 and 2, includes a plastic casing 38 which has structure therein for holding a plurality of rechargeable Ni-Cd batteries 40 therein. A pair of spaced electrodes 42, 44 are provided on the exterior of the casing 38. Specifically, one electrode is a positive electrode 42 which is used to engage with contacts 28 and 30 on the electronic apparatus 20 and the other electrode is the negative electrode 44 which is used to engage with the contact 32 on the electronic apparatus 20. The positive electrode 42 has a contact surface which is substantially larger in width than the width of the contact surface of the negative electrode 44 for reasons described herein.

A U-shaped insulating member 46 is provided in the gap between the electrodes 42, 44 and extends outwardly from the casing 38 a distance which is substantially greater than the distance the electrodes 42, 44 extend outwardly from the casing 38. The insulating member is made of a non-conductive material, such as plastic, and prevents a possible explosion of the rechargeable battery pack 22 if the battery pack 22 is placed on a metal surface or the like such that the electrodes 42, 44 come into contact with the surface.

When the rechargeable battery pack 22 is placed on a surface electrode side down, the insulating member 46 contacts the surface thereby causing the rechargeable battery pack 22 to tip to one side. Because the insulating member 46 extends further outwardly from the casing 38 than the electrodes 42, 44, the electrodes 42, 44 are prevented from coming in to contact with the surface.

The casing 38 of the rechargeable battery pack 22 has a V-shaped keyway 47 on the top surface 49 thereof. The keyway 47 engages with a like-shaped key or protrusion (not shown) on the electronic apparatus housing when the rechargeable battery pack 22 is engaged therewith as described herein. The keyway 47 ensures that the rechargeable battery pack 22 will be inserted into the electronic apparatus 20 in the correct orientation so that correct polarity is provided, that is the electrodes 42, 44 are engaged with the correct contacts 28, 30, 32 as described herein. The keyway 47 and key can be of any shape.

The non-rechargeable battery pack 24, as shown in FIGS. 4 and 5, includes a plastic casing 48 which has structure therein for holding a plurality of alkaline batteries 50 therein. A pair of conventional, spaced electrodes 52, 54, i.e. a positive electrode 52 and a negative electrode 54, are provided on the exterior of the casing 48. The positive electrode 52 engages with the second contact 30 of the electronic apparatus 20. The negative electrode 54 engages with the third contact 32 of the electronic apparatus 20. The electrodes 52, 54 on the non-rechargeable battery pack 24 do not come into contact with the first contact 28 on the electronic apparatus 20. The non-rechargeable battery pack 24, including the electrode configuration and structure, is of a conventional design. The electrodes 52, 54 are identical in size and shape.

Attention is now directed to FIG. 3 which illustrates how the external charging voltage from the DC plug 21 is applied to the electronic apparatus 20 and to the rechargeable battery pack 22. A DC jack 56 accepts the DC plug 21 for supplying the external charging DC voltage from an external source to the electronic apparatus 20 and to the contact 28. A power supply line 58 supplies the external charging voltage via a power switch 60 to the electronic apparatus 20.

The DC jack 56 contains a first blade 62, a second blade 64 and third blade 66. The first blade 62 is directly connected to the power supply line 58. The second blade 64 is connected to the first blade 62 when the DC plug 21 is not engaged with the DC jack 56 and is not connected to the first blade 62 when the DC plug 21 is inserted into the DC jack 56. The third blade 66 is grounded via a diode 68. When the DC plug 21 is inserted into the DC jack 56, the DC plug 21 breaks or disconnects the connection between the first blade 62 and the second blade 64 and the positive potential from the DC plug 21 is applied to the first blade 62 and the negative potential from the DC plug 21 is applied to the third blade 66.

The first contact 28 is connected via a resistor 70 to the power supply line 58. The second contact 30 is connected to the second blade 64 of the DC jack 56. The third contact 32 is grounded directly.

With reference to FIG. 2, when the rechargeable battery pack 22 is mounted onto the electronic apparatus 20, the negative electrode 44 of the rechargeable battery pack 22 is connected to the third contact 32 of the electronic apparatus 10 and the positive electrode 42 of the rechargeable battery pack 22 is connected to both the first contact 28 and the second contact 30 simultaneously. In order to connect the positive electrode 42 to both contacts 28 and 30 simultaneously, the positive electrode 42 has a contact surface wide enough to be electrically connected to both contacts 28 and 30 and to span the gap 34 between the contacts 28, 30. The insulating member 46 extends into the gap 36 between the second and third contacts 28, 30.

With reference to FIG. 5, when the non-rechargeable battery pack 24 is mounted onto the electronic apparatus 20, the negative electrode 54 of the non-rechargeable battery pack 24 is connected to the third contact 32 of the electronic apparatus 20 and the positive electrode 52 of the non-rechargeable battery pack 24 is connected to the second contact 30 of the electronic apparatus 20. The first contact 28 of the electronic apparatus 20 is not contacted by the electrodes 52, 54 of the non-rechargeable battery pack 24.

Accordingly, when the rechargeable battery pack 22 is mounted into the electronic apparatus 20 and in a mode in which the electronic apparatus 20 is driven by the driving voltage generated by the batteries 40 in the rechargeable battery pack 22 (thus, the DC plug 21 is not used), the positive voltage from the batteries 40 is applied via the contact 30, to the second blade 64 of the DC jack 56 and then to the first blade 62 and to the power supply line 58. When the electronic apparatus 20 is placed in a charging mode, i.e. the electronic apparatus 20 is driven by the external driving voltage by insertion of the DC plug 21 into the DC jack 56, the contact between the first blade 62 and the second blade 64 of the DC jack 56 is broken or disconnected thereby preventing energization of the electronic apparatus 20 by the driving voltage supplied by the batteries 40. The charging voltage on the power supply line 58 from the external source is applied to the electronic apparatus 20 and applied to the rechargeable battery pack 22 via the resistor 70 to the contact 28.

On the other hand, when the non-rechargeable battery pack 24 is mounted into the electronic apparatus 20 and in a mode in which the electronic apparatus 20 is driven by the driving voltage generated by the batteries 50 (thus, the DC plug 21 is not used), the positive voltage from the batteries 50 is applied via the contact 30, to the second blade 64 of the DC jack 56, and then to the first blade 62 of the DC jack 56 and to the power supply line 58. When the DC plug 21 is inserted into the DC jack 56, the contact between the first blade 62 and the second blade 64 is broken or disconnected thus preventing energization of the electronic apparatus 20 by the driving voltage supplied by the batteries 40 and thereby applying the voltage from the DC plug 21 to the power supply line 58. Because the non-rechargeable battery pack 24 does not contact the contact 28, the external charging voltage is not applied to the non-rechargeable battery pack 24.

Therefore, according to this invention, whether the rechargeable battery pack 22 or the non-rechargeable battery pack 24 is mounted into the electronic apparatus 20, when the external driving voltage is applied to the electronic apparatus 20, the charging voltage is applied only to the rechargeable battery pack 22, and never to the non-rechargeable battery pack 24. This method prevents the possibility of an accident, such as an explosion, caused by applying the charging voltage to the non-rechargeable battery pack 24.

This invention is not limited to the above-mentioned embodiment and it may be possible to add many other variations to this invention. For example, the contact 30 which is to be connected to the positive electrode 42 or 52 of either type of the battery pack 22, 24, respectively, is located between the contacts 28 and 32. It may be placed, however, at the location of contact 28, such that contact 28 is between contacts 30 and 32. Also, the power supply line 58 carries the positive voltage, however, the power supply line 58 may instead carry the negative voltage, thereby making the diode 68 connected in the reversed polarity and maintaining the ground at a positive potential. This results in reversing the polarity of all the electrodes of both the battery packs.

While a specific embodiment of the present invention is shown and described, it is envisioned that those skilled in the art may devise various modifications of the present invention without departing from the spirit and scope of the appended claims.

The invention claimed is:

1. A device adapted to be connected to an electronic apparatus selectively capable of having a non-rechargeable battery pack holding a plurality of non-rechargeable batteries or a rechargeable battery pack holding a plurality of rechargeable batteries connected thereto, said battery packs capable of supplying a driving voltage to said electronic apparatus when connected to said device, said device further being capable of having an external power source attached thereto for energizing said electronic apparatus by a DC voltage and for supplying a charging voltage to said device, said device comprising:

means for supplying DC voltage from said external power source to said electronic apparatus when said external power source is connected to said device;

means for supplying the driving voltage from one of said battery packs to said electronic apparatus when said one battery pack is connected to said device, said means for supplying driving voltage comprising a first contact and a second contact, said first contact and second contact being capable of being electrically connected to a positive electrode and a negative electrode respectively of one of said battery packs regardless of whether said battery pack is said non-rechargeable battery pack or said rechargeable battery pack;

means for preventing energization of the electronic apparatus by the driving voltage from the battery pack when the external power source is supplying DC voltage to said electronic apparatus; and means for supplying a charging voltage from said external power source to said rechargeable battery pack when said rechargeable battery pack is connected to said device to charge said rechargeable battery pack, said means for supplying a charging voltage comprising a third contact, said third contact contacting one of the electrodes of said rechargeable battery pack when said rechargeable battery pack is connected to said device for supplying said charging voltage from said external power source to said rechargeable battery pack, wherein said rechargeable battery pack includes a casing for mounting said rechargeable batteries therein, said electrodes being mounted on said casing, and further including a non-conductive insulating member connected to said casing, said insulating member extending outwardly from said casing a predetermined distance such that when said rechargeable battery pack is placed on a surface, said insulating member contacts said surface and prevents said electrodes from contacting said surface.

2. A device as defined in claim 1, wherein a gap is provided between said electrodes on said rechargeable battery pack and said non-conductive insulating member is provided within said gap.

3. A rechargeable battery pack for holding a plurality of rechargeable batteries comprising:

a casing having a positive electrode and a negative electrode mounted thereon; said casing for mounting said plurality of rechargeable batteries therein, and a non-conductive insulating member connected to said casing, said insulating member extending outwardly from said casing a predetermined distance such that when said rechargeable battery pack is placed on a surface, said insulating member contacts said surface and prevents said electrodes from contacting said surface.

4. A rechargeable battery pack as defined in claim 3, wherein a gap is provided between said electrodes on said casing and said non-conductive insulating member is provided within said gap.

* * * * *